G. W. WHEELER.
FISH DECOY BAIT.
APPLICATION FILED OCT. 10, 1919.

1,391,030.

Patented Sept. 20, 1921.

INVENTOR.
GEORGE W. WHEELER.

UNITED STATES PATENT OFFICE.

GEORGE WASHINGTON WHEELER, OF LEFROY, ONTARIO, CANADA.

FISH-DECOY BAIT.

1,391,030.  Specification of Letters Patent.  Patented Sept. 20, 1921.

Application filed October 10, 1919. Serial No. 329,847.

*To all whom it may concern:*

Be it known that I, GEORGE WASHINGTON WHEELER, of the town of Lefroy, in the county of Simcoe, in the Province of Ontario, Canada, have invented certain new and useful Improvements in Fish-Decoy Baits, of which the following is the specification.

My invention relates to improvements in fish decoy baits and the object of the invention is to devise means for catching the fish which is automatically operated by the fish when seizing the bait in his mouth and it consists essentially of the arrangement and construction of parts hereinafter more particularly explained.

In the drawings like characters of reference indicate the various parts in each figure.

Figure 1:
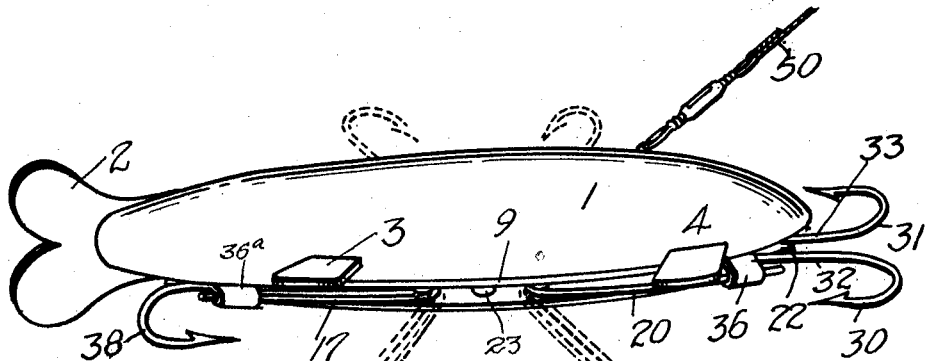
Figure 1, is a perspective view of a decoy fish bait and my fish catching device applied thereto.
Figure 2:
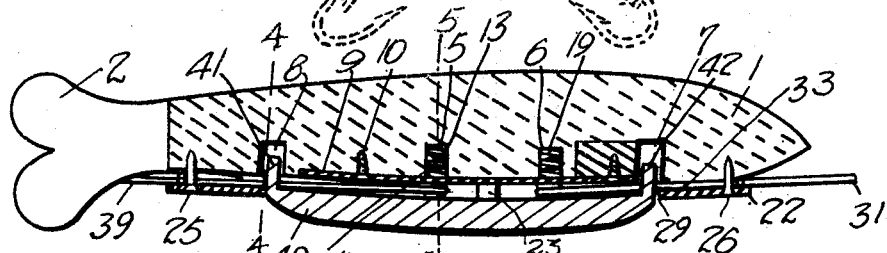
Fig. 2, is a longitudinal section through Fig. 1.

1 indicates the body of my fish decoy which is in the shape of a small fish and is provided with the usual tail piece 2 and fins 3 and 4. The under face of the body 1 is provided with rectangular recesses 5 and 6 located in the central portion of the body and recesses 7 and 8 which are located in proximity to each end of the body. Between the recesses 7 and 8 is located a plate 9 which is counter sunk in the under face of the body 1 and is secured in position by screws 10. 11 and 12 are orifices which are formed in the plate 9 opposite each recess 5 and 6. 13 is a spring which is located in the recess 5 and is formed in two coils 14 and 15 which are preferably connected at their inner ends by the cross wire portion 16. The outer ends of the coil are formed into fingers 17 and 18 for a purpose which will hereinafter appear.

Figures 4, 5:
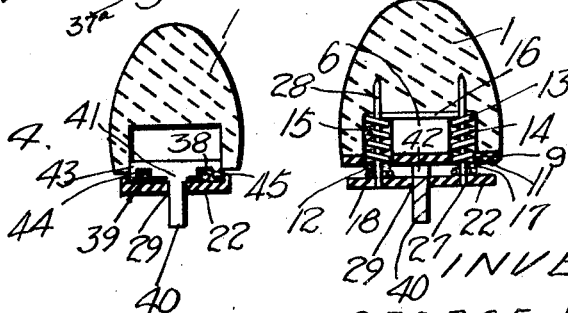
Fig. 4, is a cross sectional view on line 4—4, Fig. 2.
Fig. 5, is a cross sectional view on line 5—5, Fig. 2.

19 is a similarly formed spring located in the recess 6 the outer ends of the spring being formed into arms 20 and 21. It will be noticed on referring to Fig. 5 that the outer portions of the spring coils 14 and 15 extend through the orifices 11 and 12 in the plate 9. 22 is a plate which is secured to the body of the decoy by screws 23 and 24 which extend through the plate 22 and plate 9 into the body of the decoy. 25 and 26 are screws which secure the ends of the plate 22 to the body of the decoy. 27 and 28 are pins which are secured at their outer ends in the plate 22 and extend centrally through the coils 14 and 15 into the body 1 of the decoy as clearly indicated in Fig. 5. Similarly pins 27ˣ and 28ˣ extend centrally through the coils of the spring 19. The plate 22 is provided with a longitudinal slot 29.

30 and 31 are fish hooks which are provided with extended shanks 32 and 33 terminating in eyes 34 and 35 which are swung upon pins 27ˣ and 28ˣ. The shanks 32 and 33 of the hooks 30 and 31 are provided with loops 36 and 37 through which the ends of the arms 20 and 21 freely extend. 38 and 39 are fish hooks constructed similarly to the fish hooks 30 and 31 and are provided at their inner ends with eyes which are swung upon pins 27 and 28. The shanks of the hooks 38 and 39 are also provided with loops 36ª and 37ª corresponding to the loops 36 and 37 and through which the arms 17 and 18 extend.

40 is a pressure member which is located in the longitudinal slot 29 and protrudes downwardly therefrom. 41 and 42 are upwardly extending projections formed at each end of the pressure plate 40. The projections 41 and 42 extend up in the recesses 7 and 8. Each projection 41 and 42 is provided with a cross arm 43 each of which are provided at their ends on their under side with notches 44 and 45 through which the shanks of the fish hooks 30 and 31 and 38 and 39 extend when in the set position shown particularly in Fig. 3 and in the full line position indicated in Fig. 1.

Having described the principal parts of my invention I will now briefly describe the operation of the same.

When the hooks 30, 31, 38 and 39 are in the dotted position shown in Fig. 1, the springs 13 and 19 are out of tension. In order to set the device the pressure member 40 is first forced upwardly so as to carry the cross arms 43 into the recesses 7 and 8. The shanks 32 and 33 are then swung from the dotted position inwardly toward the side of the decoy and into a substantially parallel position between the plates 9 and 22. By this operation the arms 20 and 21 are swung around with the hooks so that the coils of the spring 13 are tightened exerting tension upon the arms 20 and 21 tending to force them outward from the position shown in full lines in Fig. 1 to the position shown in dotted lines.

Figure 3:
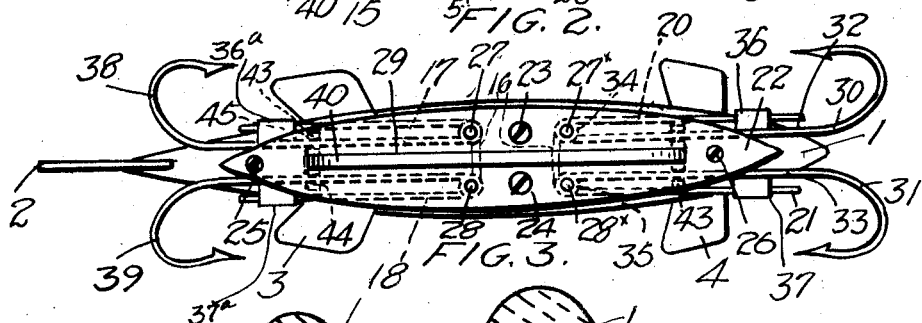
Fig. 3, is an inverted plan view of the device as shown in Fig. 1.

When the hooks are carried into the position indicated by full lines the pressure bar 40 is drawn downward against the plate 22 so as to carry the notches 44 and 45 into engagement with the shanks 32 and 33 of the hooks 30 and 31 thereby locking the hooks in position. The same operation then takes place in connection with the hooks 38 and 39. The device then is arranged as indicated in Fig. 3.

It will, of course, be understood that the fish decoy is connected to the usual tow line as indicated by 50 in Fig. 1.

It is well known that when a fish seizes the bait he attempts to grasp the center portion of the bait in his mouth. By my device when the fish attempts to do this he exerts a pressure upon the pressure bar 40 forcing it upward toward the under face of the decoy body thereby releasing the hooks 30 and 31 and 38 and 39 which are then carried swiftly into the position indicated by dotted lines in Fig. 1. The hooks coming together in the manner described engage the body of the fish and in the act of pulling away from the bait more securely fastens the fish hook in to its body.

From this description it will be seen that I have devised a very simple mechanism whereby the fish is automatically caught when seizing the decoy bait in its mouth.

What I claim as my invention is:

1. In a decoy fish bait, a bait body, opposing gripping means carried by the bait body, means for holding the gripping means in their normal position, and releasing means adapted to be operated by the jaws of the fish when in a position at right angles to the center portion of the bait body.

2. In a decoy fish bait, the combination with the body thereof of opposing fish catching means carried by the body and extending longitudinally of the body and adapted to move when freed toward each other and against each side of the body of the fish, and a yieldable pressure member for releasably holding the fish catching means in the normal position.

3. In a decoy fish bait, the combination with the bait body, of a yieldable member carried by the bait body and adapted to be depressed by the jaws of the fish closing upon the body, opposing fish engaging prongs, resilient means for forcing the prongs toward each other and against the body of the fish and means carried by the yieldable member for holding the prongs in their normal position against such resilient means and releasable by the depression of the yieldable member.

4. In a decoy fish bait, the combination with the decoy body, of a pair of fish hook members swung at their inner ends upon the body of the decoy fish bait at one side of its longitudinal center, resilient means tending to swing the fish hooks from a position in longitudinal alinement with the decoy bait body to a position at right angles to the decoy bait body, means extending longitudinally of the decoy body and protruding from the face of the body for locking the hooks in their longitudinal alined position against the resilient pressure, and means for releasing such locking means operated by the gripping of the decoy in the jaws of the fish.

5. In a decoy fish bait, the combination with the decoy body, of a longitudinally slotted plate secured to the lower face of the decoy bait body and spaced apart therefrom, a pair of fish hook members swung between the plate and the decoy bait body at each side of such longitudinal slot and at each side of the central portion of the decoy, resilient means tending to carry the hooks from a position in longitudinal alinement with the fish decoy bait body to a position at right angles to the fish decoy bait body, a yieldable bar mounted in the longitudinal slot of the plate, cross arms at each end of the pressure bar having notches in their under side adapted to engage the fish hooks intermediately of their length and hold them in the set position against the spring tension.

6. In a decoy fish bait, the combination of a body portion and opposing fish catching means carried by the body portion and movable toward each other to entrap a fish therebetween, of releasable means normally separating said catching means adapted to be released by the seizure of the body portion in the mouth of the fish.

7. In a decoy fish bait, a body portion and hooks at each end of the body portion and on opposite sides thereof, releasable means normally tending to move the end hooks on each side of the body toward each other and away from the hooks on the opposite side of the body, and releasable means for normally holding the hooks against such movement.

GEORGE WASHINGTON WHEELER.